(12) United States Patent
Selby

(10) Patent No.: US 8,862,496 B2
(45) Date of Patent: *Oct. 14, 2014

(54) INCENTIVE-BASED WEBSITE ARCHITECTURE

(71) Applicant: International Business Machines Corporation, Armonk, NY (US)

(72) Inventor: David A Selby, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,622

(22) Filed: Jul. 3, 2013

(65) Prior Publication Data

US 2013/0297415 A1    Nov. 7, 2013

Related U.S. Application Data

(63) Continuation of application No. 10/674,188, filed on Sep. 29, 2003, now Pat. No. 8,527,332.

(51) Int. Cl.
*G06Q 30/00* (2012.01)
*G06Q 30/02* (2012.01)

(52) U.S. Cl.
CPC ............ *G06Q 30/0254* (2013.01); *G06Q 30/02* (2013.01); *G06Q 30/0224* (2013.01)
USPC ....................................................... 705/14.1

(58) Field of Classification Search
CPC .................................................... G06Q 90/00
USPC ....................................................... 705/14.1
See application file for complete search history.

(56) References Cited

U.S. PATENT DOCUMENTS

| | | | |
|---|---|---|---|
| 5,848,396 | A | 12/1998 | Gerace |
| 5,915,243 | A | 6/1999 | Smolen |
| 6,009,412 | A | 12/1999 | Storey |
| 6,113,495 | A | 9/2000 | Walker et al. |
| 6,175,869 | B1 | 1/2001 | Ahuja et al. |
| 6,263,327 | B1 | 7/2001 | Aggarwal et al. |
| 6,267,672 | B1 | 7/2001 | Vance |
| 6,358,150 | B1 | 3/2002 | Mir et al. |

(Continued)

OTHER PUBLICATIONS

Fagin et al., "Random Walks with 'Back Buttons'," Proceedings of the Thirty Second Annual ACM Symposium on Theory of Computing, pp. 484-493 (2000).

(Continued)

*Primary Examiner* — Daniel Lastra
(74) *Attorney, Agent, or Firm* — Saul Ewing LLP

(57) ABSTRACT

The present invention applies gaming theory and well-understood sales processes and techniques to allow the operator of an interactive sales medium to control what is displayed to a user of the medium in a manner that signals their intentions (e.g., looking for a lower price, looking for a particular incentive, etc.) so that the "strategies" being used by the consumer can be identified and exploited to lead the consumer to a desired end choice. In particular, upon identification of the strategies being used by the consumer, incentives (e.g., gradually increasing rewards and/or decreasing "punishments") are presented to the consumer in such a way that the margins achieved by an eventual sale are slowly decreased with each presentation of the incentives to the consumer. Since the presentation of each incentive increases the likelihood the consumer will make a purchase, margins are maximized for the seller.

8 Claims, 3 Drawing Sheets

(56) References Cited

U.S. PATENT DOCUMENTS

| | | | |
|---|---|---|---|
| 6,374,297 | B1 | 4/2002 | Wolf et al. |
| 6,385,641 | B1 | 5/2002 | Jiang et al. |
| 8,527,332 | B2 * | 9/2013 | Selby .................. 705/14.1 |
| 2001/0014868 | A1 | 8/2001 | Herz et al. |
| 2002/0062245 | A1 | 5/2002 | Niu et al. |
| 2003/0028518 | A1 | 2/2003 | Mankoff |

OTHER PUBLICATIONS

"Layering of pictures based on predicting modeling," Research Disclosure, Abstract No. 446146, pp. 1031 (Jun. 2001).

* cited by examiner

INCENTIVE-BASED WEBSITE ARCHITECTURE

CROSS REFERENCE TO RELATED APPLICATIONS

This application is a continuation of U.S. application Ser. No. 10/674,188, filed Sep. 29, 2003, the entire contents of which is hereby incorporated herein by reference.

BACKGROUND OF THE INVENTION

1. Field of the Invention

This invention relates to the management of visitors to a website and, more particularly, to a system and method for increasing the activity of a website user through the use of an incentive-based website architecture.

2. Description of the Related Art

The recent explosion in the user of the World Wide Web (hereinafter "the web") has created numerous opportunities for content providers such as advertisers and sellers of products and services to display and sell to consumers. It is becoming apparent, however, that advertising and sales techniques that in the past were practiced by virtually all advertisers and sellers do not necessarily apply to advertising and sales on the web.

In a typical "bricks and mortar" sales location, a salesperson often will have in mind certain products that they wish to actively "push" to consumers. Their goal is to sell as many of the products as possible at the highest margin possible. However, the salesperson may be willing to sacrifice some of the sales margin in order to make a sale and/or in order to sell multiple units of the product. Thus, the salesperson will "lead" the customer down a "path" that will ideally result in maximum sales units at a maximum price, but which path is replete with numerous branches that, from the salesperson's point of view, provide gradually reduced margins or additional incentives for the buyer to make the purchase. In other words, the salesperson will whittle away at margins as slowly as possible until reaching the point at which the buyer is convinced to make the purchase.

This process has been honed by salespersons over the years to an art form, and salespeople are very much aware of which paths are easier to lead a customer down (and which are harder), as well as which paths result in higher (or lower) profits. However, the web does not offer the same ability for a salesperson to interactively monitor the sale and minimize their "loss" on the original sales price. Typically, e-commerce websites will offer incentives such as free shipping, a discounted price, additional items free (e.g., two-for-one) and the like as an incentive to make a sale. However, these incentives are offered to each customer randomly from the beginning, i.e., the website does not offer the incentive the way a fallback position as a live salesperson would, instead offering them uniformly to all, or a particular class of, customers.

Accordingly, it would be desirable to have available to a seller using an interactive sales medium (e.g., the World Wide Web, call centers, intelligent vending machines, etc.) the ability to identify the most likely paths for the interactive sales medium to be followed during the sales process and be able to provide gradually increasing rewards (or decreasing "punishments") along these paths, thereby maximizing the margin on sales made in the interactive sales medium.

SUMMARY OF THE INVENTION

The present invention applies gaming theory and well-understood sales processes and techniques to allow the operator of an interactive sales medium to control what is displayed to a user of the medium in a manner that signals their intentions (e.g., looking for a lower price, looking for a particular incentive, etc.) so that the "strategies" being used by the consumer can be identified and exploited. In particular, upon identification of the strategies being used by the consumer, incentives (e.g., gradually increasing rewards and/or decreasing "punishments") are presented to the consumer in such a way that the margins achieved by an eventual sale are gradually decreased with each presentation of the incentives to the consumer. Since the presentation of each incentive increases the likelihood the consumer will make a purchase, margins are maximized for the seller.

DETAILED DESCRIPTION OF THE PREFERRED EMBODIMENTS

Figure 1:
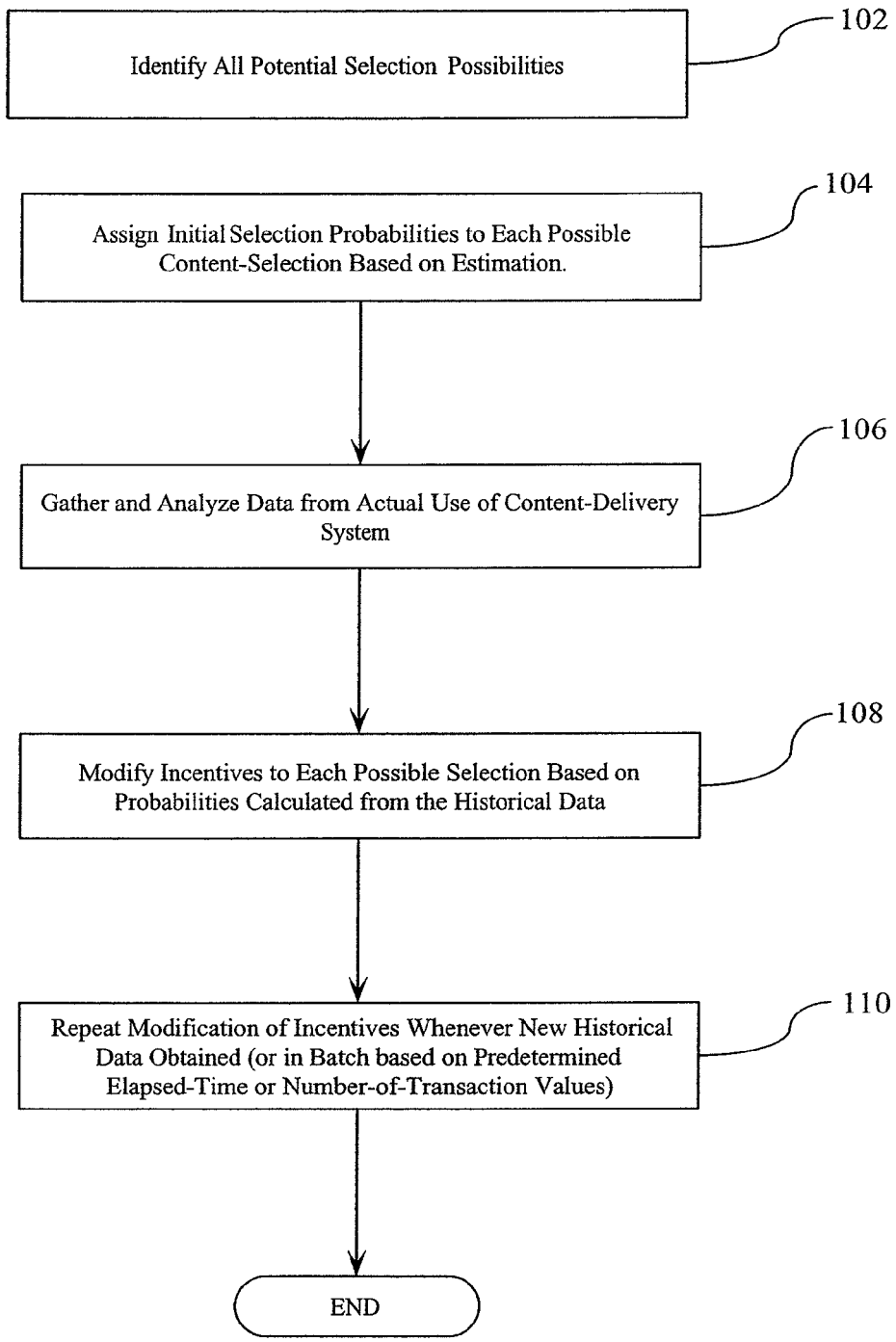
FIG. 1 is a flowchart illustrating generally steps taken by a website developer to take advantage of the present invention.

FIG. 1 is a flowchart illustrating generally steps taken by a website developer to take advantage of the present invention. It is understood that the present invention is not limited to website sales and has applicability to any interactive medium in which a user/consumer is given choices and can make selections without intervention by a salesperson.

The term "incentive" as used herein refers to any action which encourages action by a user of the system, and the stronger an incentive is, the more likely it is to encourage the desired action. For example, rewards such as free shipping, two-for-one deals, discounts on subsequent purchases, or time-based rewards (e.g., "order in 60 seconds to receive X") are contemplated as being "positive incentives". Further, "negative incentives" can also be used in the form of "punishments" as used in gaming theory parlance. For example, the user could be given a "purchase now and receive free shipping" option, and if they fail to make the selection, subsequently be given a "purchase now and receive 80% off shipping" option, or shipping insurance could be initially offered, and then rescinded if the user declines the initial offer but continues to show interest. Thus, the user will see that there is benefit to selecting early in the process instead of continuing on, since the incentives offer reduced benefits the longer the user waits to make the purchase.

Referring to FIG. 1, at step 102, all potential selection possibilities are identified. In the context of a website, this would involve identifying each web page, and each link within the site presented to a viewer of a particular web page.

At step 104, initial selection probabilities are assigned to each possible content-selection. Since, at this point, there is no data available regarding selection probabilities, these initial (default) selection possibilities are based on estimation.

At step 106, data obtained from actual use of the content delivery system is gathered and analyzed. Typically, this would be in the form of clickstream data for websites. In particular, the paths taken by users to an end result (e.g., the selection of an item for purchase) are identified and probabilities established with respect to the likelihood that particular selections will eventually lead to subsequent selections and the eventual end result.

At step 108, based on the analysis performed in step 106, incentives are established to "draw" users to make selections that have a relatively low probability of being made. In other words, choices that have a high probability of being selected, that is, that require little or no incentive to select, will either be associated with no incentive or be associated with an incentive of very low strength.

In contrast, more difficult paths to lure customers down, i.e., those with low selection probabilities, are given relatively stronger incentives, since the statistical analysis shows that these paths are less likely to be taken without incentive.

At step 110, modification of the incentives is performed whenever new historical data obtained indicates different probabilities than existed previously.

Thus, using the steps illustrated in FIG. 1, a website is analyzed to identify paths least likely to be followed, and incentives are then assigned to these paths so that they are more likely to be followed.

Figure 2:
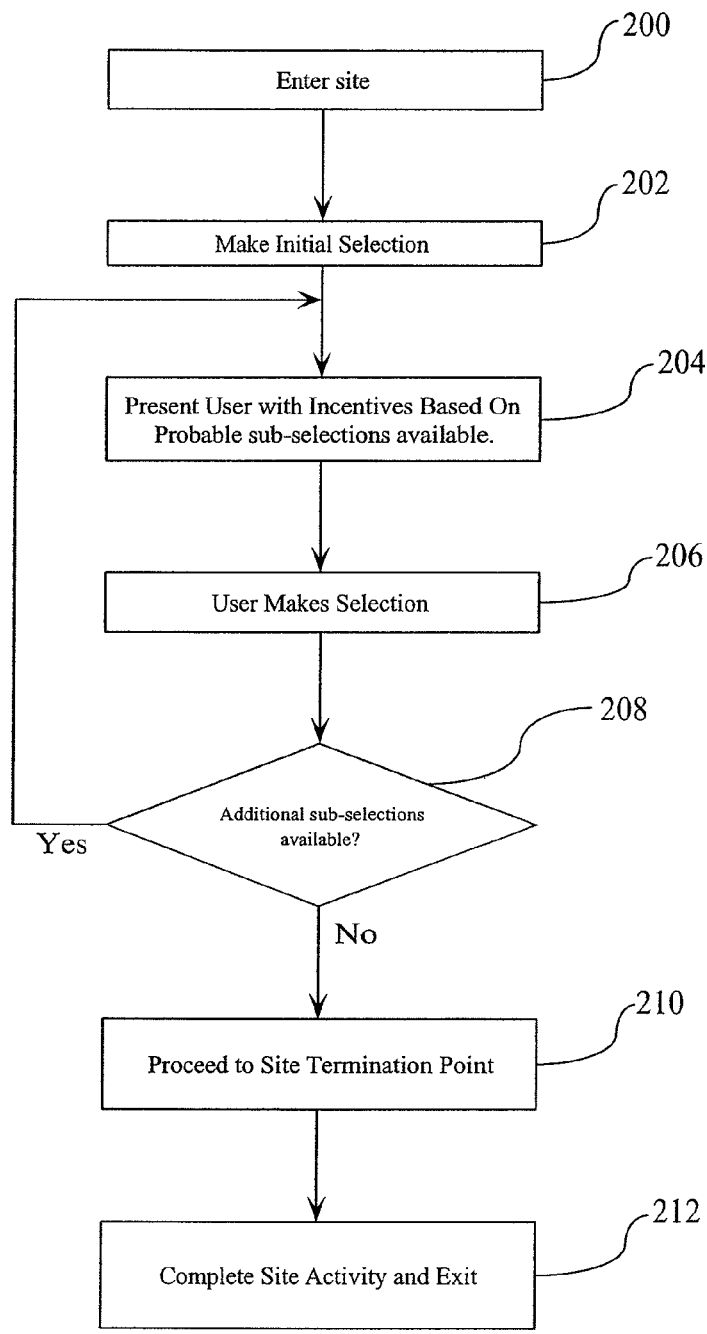
FIG. 2 is a flowchart illustrating the operation of a website constructed using the principles illustrated in FIG. 1.

FIG. 2 is a flowchart illustrating the operation of a website constructed using the principles illustrated in FIG. 1. Referring to FIG. 2, at step 200, a user enters the site, and at step 202, the user makes an initial selection, e.g., by clicking on a "new products" or "clearance" or other icon displayed on the website. At step 204, the user is presented with incentives (if appropriate) based upon the probable sub-selections within the selected category that are available. At step 206, the user makes a selection, and at step 208 a determination is made as to whether or not there are additional sub-selections available. If there are, the process proceeds back to step 204, and the user is presented with additional incentives (if appropriate). If there are no additional sub-selections available, e.g., if the result is "purchase", then the process proceeds to a site termination point at step 210, and the site activity is completed and the user exits at step 212.

Figure 3:
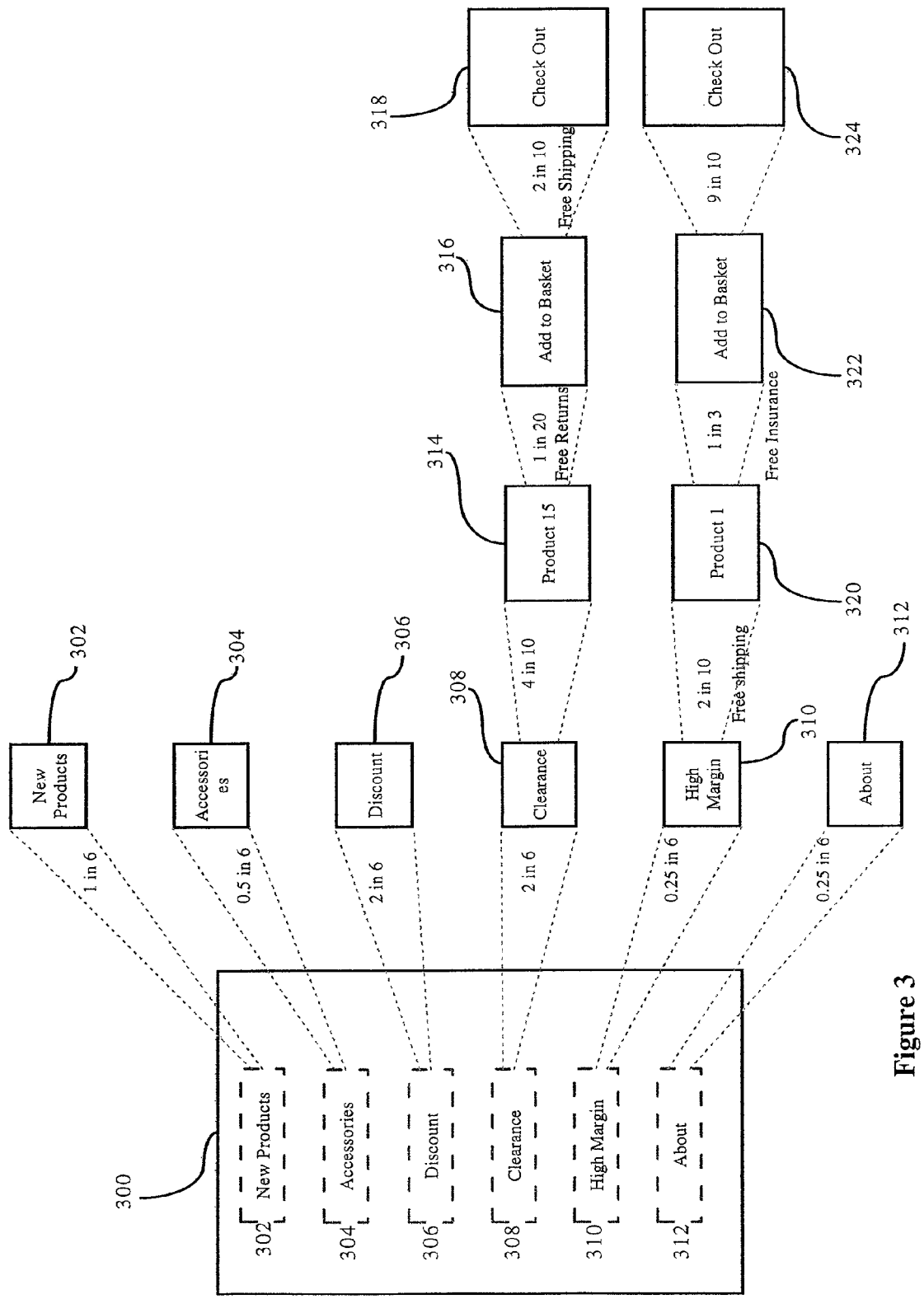
FIG. 3 is a tree diagram illustrating the overall concept of the present invention.

FIG. 3 is a tree diagram illustrating the overall concept of the present invention applied to a simple e-commerce website. A homepage 300 is illustrated with six selections 302, 304, 306, 308, 310, and 312 illustrated as being available from homepage 300.

As shown, selection 302 corresponds to "new products", selection 304 corresponds to "accessories", selection 306 corresponds to "discount", selection 308 corresponds to "clearance", selection 310 corresponds to "high margin", and selection 312 corresponds to "about". It is noted that these may not be the specific labels that would appear on the website. For example, high margin items would not typically be listed under the term "high margin" but would instead have another name, but the products that are associated with selection 310 are, in this example, high margin items.

The example of FIG. 3 follows two alternative paths. The first path relates to clearance selection 308 and the second path relates to high margin selection 310. As shown on the webpage 300, each of the navigation buttons has a probability associated with it. These probabilities are initially set based on estimation and then are revised based on historical analysis of traffic through the website. As can be seen, selection 302 has a one-out-of-six probability, selection 304 has a 0.5-out-of-six probability, selection 306 has a two-out-of-six probability, selection 308 has a two-out-of-six probability, selection 310 has a 0.25-out-of-six probability, and selection 312 has a 0.25-out-of-six probability.

As illustrated in FIG. 3, the clearance selection has a two-out-of-six probability of being selected. Relative to the other choices, this is a high probability. Upon selecting selection 308, the user will be presented with a series of products available for purchase that have been characterized as clearance items. As shown in selection 308, there is a four-out-of-ten probability that the user selecting the clearance selection will select, for viewing, information regarding selection 314 corresponding to "Product 15". Following the path illustrated in FIG. 3, there is only a one-in-twenty chance that, after selecting Product 15 for viewing, the purchaser will proceed to selection 316 and add it to their "basket". Since this is a relatively low probability, the user is given an incentive to add the item to their basket, in this example, free returns if they do not like the item for any reason. Once the item has been added to the basket, there is a two-out-of-ten likelihood that they will proceed to choice 318 and check-out, meaning complete and purchase the item (referred to generally as a "desired end choice"). So to increase the probability that they will actually proceed to the desired end choice (check-out and buy the item), free shipping is offered as an incentive at this point.

The alternative path shown in FIG. 3 is for the selection of high margin products by selection of the button 310 associated with high margin products. As can be seen in FIG. 3, the probability of somebody selecting these high margin products from the homepage are small at 0.25-out-of-six. Thus, in order to encourage its selection, free shipping is given as an option immediately. Once selecting the high margin selection 310, a series of products are illustrated for the user with choice 320 (Product 1) being among them. The probability of Product 1 being selected is two-out-of-ten, so to encourage a user to go further and add Product 1 to their basket (choice 322), they are given an incentive of free insurance on the shipping. Once the person has added this item to their basket with free shipping and free insurance, the probability of them proceeding to check-out (choice 324) is nine-out-of-ten. Since it is such a high probability that they will proceed to the desired end choice (go to check-out), there is no incentive offered at this point.

The concept of the present invention is based upon gaming theory. Gaming theory is the science of how games of chance work. Considering the players, the strategic environment, and payoffs, the present invention proposes applying game theory to managing visitors to a website. The strategy is based on interaction with potential and present customers (players). Considering the web server to be one player, and the customer to be another player, fellow players can be rewarded/punished based upon choices made during operation of the website. Margin is conceded to achieve a sale. The variables to be optimized are the margin vs. the size of the market basket. Strategies are based on the historical paths taken through the website, which are tracked, and from that probabilities are calculated as to the next potential step. Reward and punishment (incentives) take the form of discounts or removal of options (free shipping, free package insurance, etc.). Historical web page historical probability weighting is used. The paths are ordered by the probability of the most gain (basket size and profitability). Using game theory analysis, the best business outcome for a visit to a site or interactive channel are identified. An existing website is preanalyzed to establish the "rules" of the "game". Reward and punishment are used interactively.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a web server offering the interactive experience. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-3 support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A computer-implemented method of influencing the actions of users of an interactive content-delivery system, comprising configuring a computer to perform the steps of:
    identifying probabilities of selection with respect to all selections offered by said interactive content-delivery system, and designating certain of said selections as low probability selections based on the identified probabilities; and
    presenting users of said interactive content-delivery system with incentives based upon said probabilities, whereby said low probability selections receive higher-value incentives than selections having higher probability of selection than said low probability selections.

2. The method of claim 1, wherein said identifying step includes at least the step of: estimating probabilities of selection for each possible selection offered by said interactive content delivery system if historical user data for said interactive content delivery system is unavailable.

3. The method of claim 2, wherein said identifying step further comprises at least the step of analyzing historical user data for said interactive content delivery system to identify probability of selection based on said historical user data.

4. The method of claim 3, wherein said step of analyzing historical user data comprises at least the step of performing historical analysis of paths taken by users who have not been presented with incentives.

5. The method of claim 3, wherein said step of analyzing historical user data is continually updated with new historical user data obtained after users of said interactive content-delivery system have been presented with incentives.

6. The method of claim 3, wherein said incentives are selected based on gaming theory and include both positive and negative incentives.

7. The method of claim 6, wherein said interactive content-delivery system comprises a web-based e-commerce site.

8. A computer-implemented method of managing website visitors, comprising configuring a computer to perform the steps of:
    receiving a content selection from a website user;
    analyzing said content selection and determining probabilities associated with the selection of all sub-choices presented to said user based on said content selection, and designating certain of said selections as low probability selections based on the identified probabilities;
    presenting incentives associated with each sub-choice based upon said probabilities, whereby said low probability selections receive higher-value incentives than selections having higher probability of selection than said low probability selections; and
    repeating the above steps until a desired end choice has been selected.

* * * * *